United States Patent [19]

Mizuhara

[11] Patent Number: 4,486,386

[45] Date of Patent: Dec. 4, 1984

[54] REACTIVE METAL-PALLADIUM-GOLD BRAZING ALLOYS

[75] Inventor: Howard Mizuhara, Hillsborough, Calif.

[73] Assignee: GTE Products Corporation, Stamford, Conn.

[21] Appl. No.: 475,264

[22] Filed: Mar. 14, 1983

Related U.S. Application Data

[63] Continuation-in-part of Ser. No. 422,625, Sep. 24, 1982, Pat. No. 4,448,605.

[51] Int. Cl.$^3$ .............................................. C22C 5/02
[52] U.S. Cl. ................................... 420/508; 420/507; 228/263.11; 219/85 H; 428/606
[58] Field of Search ............... 420/508, 507; 148/430, 148/442; 228/263.11, 263.19, 263.12, 56 R; 219/85 R, 85 H

[56] References Cited

FOREIGN PATENT DOCUMENTS 1119933 12/1961 Fed. Rep. of Germany ...... 420/508
1121339 1/1962 Fed. Rep. of Germany ...... 420/508

OTHER PUBLICATIONS

Compiled by Wm. Roeser, "Gold and Gold Alloys," Metals Handbook, 1948 edition, p. 1116.

*Primary Examiner*—L. Dewayne Rutledge
*Assistant Examiner*—Debbie Yee
*Attorney, Agent, or Firm*—Donald R. Castle

[57] ABSTRACT

Reactive metal-palladium-gold ductile alloys are suitable for brazing ceramics, other non-metallic and metallic materials.

8 Claims, No Drawings

REACTIVE METAL-PALLADIUM-GOLD BRAZING ALLOYS

CROSS REFERENCE TO RELATED APPLICATION

This application is a continuation-in-part of U.S. application Ser. No. 422,625 filed Sept. 24, 1982, now U.S. Pat. No. 4,448,605 issued May 15, 1984 and assigned to assignee of the present invention.

FIELD OF INVENTION

This invention relates to brazing alloys. More particularly it relates to brazing alloys containing a reactive metal, palladium and gold and used where ductile brazed joint is required and used under oxidizing environment, corrosive environment at elevated temperatures.

BACKGROUND

Alloys containing titanium are known. These alloys contain relatively high levels of titanium. Generally the titanium content is above about 7% by weight. These alloys are not ductile and cannot be rolled to a foil in a satisfactory manner and upon brazing the brazed joint is hard and brittle.

With regard to brazing a ceramic material to a metal member, the reliability of the brazed joint is good when the brazing alloy is ductile. A ductile alloy is necessary because of the thermal expansion mismatch between metal and ceramic members.

SUMMARY OF THE INVENTION

Reactive metal-precious metal alloys containing specified amounts of gold and palladium are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal in the alloys of this invention which also contain gold and palladium cannot appreciably exceed about 4% by weight and achieve a ductile material which upon brazing is free of dispersed phases.

The amount of reactive metal in the alloys of this invention is from about 0.05% by weight to about 4% by weight, with from about 0.5% by weight to about 2% by weight being preferred. By reactive metal, within the context of this disclosure, is meant titanium, zirconium, vanadium and mixtures thereof. While titanium generally is the preferred reactive metal, alloy compositions of Ti-Zr and Ti-V are equally effective.

The weight percent of palladium, can vary from about 5% by weight to about 45% by weight. The preferred level is generally from about 8% by weight to about 42% by weight.

The weight percent of gold can vary from about 50% by weight to about 94.9% by weight. It is preferred for gold to be present in amounts of from about 55% by weight to about 91% by weight.

Especially preferred alloys are as follows:

| Ti % by weight | Pd % by weight | Au % by weight |
|---|---|---|
| 0.5 to 2 | 6 to 10 | 88 to 93 |
| 0.5 to 2 | 18 to 22 | 76 to 81 |
| 1 to 2 | 38 to 42 | 56 to 61 |

Various alloys are prepared by skull melting using a tungsten electrode and an argon atmosphere. The alloys are ductile and are rolled, to foils using an intermediate vacuum anneal. The thickness of the foil is of from about 2 to 6 mils.

The compositions of the alloys and their melting temperatures are given in Table 1.

TABLE 1

| Alloy | Element (% by weight) | | | Melting Point °C. |
|---|---|---|---|---|
| | Ti | Pd | Au | |
| 1 | 0.5 | 8 | 91.5 | 1240 |
| 2 | 0.5 | 20 | 79.5 | 1360 |
| 3 | 1 | 40 | 59 | 1470 |

The alloys are suitable for a variety of brazing applications. For example they are useful for brazing Ceramic to Ceramic, such as brazing Alumina to Alumumina or Alumina to Mullite for high temperature application in air. The Gold-Palladium reactive metal alloys will not oxidize when heated in air and bonding high temperature oxidation resisting alloys such as Ni, Cr alloys system to ceramics.

EXAMPLE 1

A 2 mil foil of 20% Pd, 79.5 Au, 0.5 Ti alloy was placed between a 97.5% alumina body produced and sold by WESGO Division of GTE Products Corporation under the trademark of Al-300, and a molybdenum metallic sheet and brazed under a vacuum of $10^{-5}$ mm Hg at 1390° C. The alloy melted and brazed the alumina body to the metal sheet with excellent results. Another molybdenum sheet was placed on the opposite face of the same alumina body with a 2 mil foil of 8% Pd, 91.5 Au, 0.5 Ti alloy placed therebetween. The total assembly was heated to 1280° C. in a $10^{-5}$ mm Hg vacuum resulting in a second successful braze on a same assembly without melting the original braze. The technique is called step brazing; additional brazes can be carried out using lower temperature brazing alloys on the same assembly.

EXAMPLE 2

Applications requiring air-heating in the 1200° C. will eliminate most materials and braze alloys. A ceramic assembly consisting of AL-300 ceramic cylinders, and two AL-300 ceramic covers are assembled, to form a right circular cylinder with ends covered. A 2 mil thickness preform with a composition 40% Pd, 59% Au, 1% Ti is placed at each end. The assembly is placed in a vacuum furnace and brazed at 1500° C. under $10^{-5}$ mm Hg vacuum. The assembly is found to be hermetically sound.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article consisting essentially of a ductile brazing alloy foil having a composition consisting essentially of from about 0.05% to about 4% by weight of a reactive metal selected from the group consisting of titanium, vanadium, zirconium and mixtures thereof, from about 5% by weight to about 45% by weight of palladium and from about 55% by weight to about 94.9% by weight of gold thereof.

2. An alloy according to claim 1 wherein said reactive metal is titanium.

3. An alloy according to claim 1 wherein said reactive metal is present in an amount of from about 0.5% to about 2% by weight.

4. An alloy according to claim 3 wherein palladium is present in an amount of from about 8% to about 42% by weight.

5. An alloy according to claim 4 wherein gold is present in amounts of from about 55% by weight to about 91% by weight.

6. An alloy according to claim 2 wherein titanium is present in amounts of from about 0.05% to about 2% by weight, palladium is present in amounts of from about 6% to 10% by weight and gold is present in amounts of 88% to 93% by weight.

7. An alloy according to claim 2 wherein titanium is present in amounts of from about 1% to about 2% by weight, palladium is present in amounts of from about 18% to about 22% by weight and gold is present in amounts of from about 76% to about 81% by weight.

8. An alloy according to claim 2 wherein titanium is present in amounts of from about 1% to 2% by weight, palladium is present in amounts of from about 38% to about 42% by weight and gold is present in amounts of from about 56% to about 61% by weight.

* * * * *